United States Patent
Wilkerson et al.

(10) Patent No.: US 10,458,685 B2
(45) Date of Patent: Oct. 29, 2019

(54) ABSORPTION SUBCOOLER FOR A REFRIGERATION SYSTEM

(71) Applicant: Heatcraft Refrigeration Products LLC, Stone Mountain, GA (US)

(72) Inventors: Carlton Wilkerson, Columbus, GA (US); Bucky William Edwards, Phenix City, AL (US); Masood Ali, Hatchechubbee, AL (US)

(73) Assignee: Heatcraft Refrigeration Products LLC, Stone Mountain, GA (US)

( * ) Notice: Subject to any disclaimer, the term of this patent is extended or adjusted under 35 U.S.C. 154(b) by 402 days.

(21) Appl. No.: 15/346,329

(22) Filed: Nov. 8, 2016

(65) Prior Publication Data

US 2018/0128518 A1    May 10, 2018

(51) Int. Cl.
| | |
|---|---|
| *F25B 25/02* | (2006.01) |
| *F25B 40/04* | (2006.01) |
| *F25B 27/00* | (2006.01) |
| *F25B 40/02* | (2006.01) |
| *F25B 41/06* | (2006.01) |
| *F25B 1/10* | (2006.01) |

(Continued)

(52) U.S. Cl.
CPC ............ *F25B 25/02* (2013.01); *F25B 1/10* (2013.01); *F25B 5/02* (2013.01); *F25B 7/00* (2013.01); *F25B 15/06* (2013.01); *F25B 27/005* (2013.01); *F25B 27/007* (2013.01); *F25B 29/006* (2013.01); *F25B 37/00* (2013.01); *F25B 40/00* (2013.01); *F25B 40/02* (2013.01); *F25B 40/04* (2013.01); *F25B 41/062* (2013.01); *F25B 2400/13* (2013.01); *Y02A 30/277* (2018.01); *Y02B 30/62* (2013.01)

(58) Field of Classification Search
CPC .......... F25B 15/06; F25B 25/02; F25B 40/00; F25B 15/05; F25B 37/00; F25B 40/02; F25B 40/04; F25B 7/00; F25B 7/04; F25B 27/005; F25B 27/007; F25B 29/006; Y02A 30/277
See application file for complete search history.

(56) References Cited

U.S. PATENT DOCUMENTS

| | | | | | |
|---|---|---|---|---|---|
| 3,314,247 | A | * | 4/1967 | Aronson | F25B 15/06 62/101 |
| 4,031,712 | A | * | 6/1977 | Costello | F25B 15/00 62/483 |

(Continued)

FOREIGN PATENT DOCUMENTS

| | | | | |
|---|---|---|---|---|
| CA | 2955407 A1 | * | 2/2016 | ............. F25B 15/06 |
| CN | 1916530 A | * | 2/2007 | |

(Continued)

OTHER PUBLICATIONS

Communication with Extended European Search Report in EP Application No. 17200471.5-1008, dated Apr. 24, 2018, 7 pages.

*Primary Examiner* — Cassey D Bauer
*Assistant Examiner* — Jenna M Hopkins
(74) *Attorney, Agent, or Firm* — Baker Botts L.L.P.

(57) ABSTRACT

An absorption subcooler comprises a first heat exchanger operable to receive refrigerant from a compressor of a refrigeration system and apply a first cooling stage to the refrigerant. The absorption subcooler is further operable to discharge the refrigerant to a gas cooler operable to apply a second cooling stage to the refrigerant.

20 Claims, 3 Drawing Sheets

(51) Int. Cl.
  *F25B 5/02*  (2006.01)
  *F25B 40/00* (2006.01)
  *F25B 29/00* (2006.01)
  *F25B 7/00*  (2006.01)
  *F25B 37/00* (2006.01)
  *F25B 15/06* (2006.01)

(56) References Cited

U.S. PATENT DOCUMENTS

| | | | | |
|---|---|---|---|---|
| 4,070,870 A | * | 1/1978 | Bahel | F24D 11/003 62/235.1 |
| 4,171,619 A | * | 10/1979 | Clark | F25B 25/02 62/235.1 |
| 4,248,049 A | * | 2/1981 | Briley | F24D 11/0221 62/235.1 |
| 4,285,211 A | * | 8/1981 | Clark | F25B 25/02 62/335 |
| 4,873,839 A | * | 10/1989 | Dessanti | F25B 11/00 62/238.6 |
| 5,203,161 A | * | 4/1993 | Lehto | B01D 53/263 60/39.53 |
| 5,666,818 A | * | 9/1997 | Manrique-Valadez | F25B 27/007 62/235.1 |
| 6,000,211 A | * | 12/1999 | Bellac | F01K 21/047 60/39.182 |
| 6,073,454 A | * | 6/2000 | Spauschus | C09K 5/041 62/101 |
| 6,415,614 B1 | * | 7/2002 | Greenfield | C09K 5/041 62/112 |
| 8,720,216 B1 | * | 5/2014 | Said | F25B 15/06 62/113 |
| 9,134,056 B2 | * | 9/2015 | Levy | F24F 3/1417 |
| 10,132,536 B2 | * | 11/2018 | Azzouz | F25B 39/04 |
| 2003/0057165 A1 | * | 3/2003 | Carson | B01D 3/007 210/774 |
| 2010/0107662 A1 | * | 5/2010 | Mazumder | F01K 23/068 62/101 |
| 2010/0212350 A1 | * | 8/2010 | Gu | F25B 5/02 62/430 |
| 2010/0326100 A1 | * | 12/2010 | Taras | F25B 1/10 62/115 |
| 2011/0314856 A1 | * | 12/2011 | Willgohs | F24D 17/02 62/235.1 |
| 2012/0009075 A1 | * | 1/2012 | Ravikumar | F04B 37/12 417/313 |
| 2012/0055182 A1 | * | 3/2012 | Dube | F24F 3/1417 62/81 |
| 2012/0255302 A1 | * | 10/2012 | Hugelman | F01K 25/10 60/651 |
| 2014/0250941 A1 | * | 9/2014 | Steele | F25B 27/00 62/323.1 |
| 2014/0260341 A1 | * | 9/2014 | Vaisman | B64D 13/08 62/56 |
| 2014/0260391 A1 | * | 9/2014 | Kopko | F25B 25/005 62/238.6 |
| 2014/0322118 A1 | * | 10/2014 | Vera-Castaneda | B01D 53/1406 423/243.11 |
| 2014/0352351 A1 | * | 12/2014 | Xu | C09K 5/16 62/476 |
| 2015/0292784 A1 | * | 10/2015 | Yamanis | H02J 3/381 62/236 |
| 2015/0345835 A1 | * | 12/2015 | Martin | F25B 7/00 62/238.3 |
| 2016/0003504 A1 | * | 1/2016 | Sakamoto | F25B 13/00 62/238.3 |
| 2016/0096629 A1 | * | 4/2016 | Vaisman | F25B 41/00 62/115 |
| 2017/0030612 A1 | * | 2/2017 | Michel | F25B 17/083 |
| 2017/0314825 A1 | * | 11/2017 | Scancarello | C10M 171/008 |
| 2018/0120003 A1 | * | 5/2018 | Haack | F25B 7/00 |
| 2018/0149393 A1 | * | 5/2018 | Srichai | F25D 11/027 |

FOREIGN PATENT DOCUMENTS

| | | | |
|---|---|---|---|
| DE | 102005004397 A1 | * 9/2005 | ........... B60H 1/3201 |
| EP | 2133636 A1 | 12/2009 | |
| EP | 2149765 A2 | * 2/2010 | ............. F02C 7/143 |
| WO | WO-8902056 A1 | * 3/1989 | ............. F25B 25/02 |
| WO | WO2005019737 A2 | 3/2005 | |
| WO | WO2007022778 A1 | 3/2007 | |

\* cited by examiner

ABSORPTION SUBCOOLER FOR A REFRIGERATION SYSTEM

TECHNICAL FIELD

This disclosure relates generally to a refrigeration system. More specifically, this disclosure relates to a refrigeration system including an absorption subcooler.

BACKGROUND

Refrigeration systems can be used to regulate the environment within an enclosed space. Various types of refrigeration systems, such as residential and commercial, may be used to maintain cold temperatures within an enclosed space such as a refrigerated case. An example of a refrigerated case includes a grocery case that stores fresh or frozen food products. To maintain cold temperatures within refrigerated cases, refrigeration systems control the temperature and pressure of refrigerant as it moves through the refrigeration system. When controlling the temperature and pressure of the refrigerant, refrigeration systems consume power. It is generally desirable to operate refrigeration systems efficiently in order to avoid wasting power.

SUMMARY OF THE DISCLOSURE

According to one embodiment, an absorption subcooler comprises a first heat exchanger operable to receive refrigerant from a compressor of a refrigeration system and apply a first cooling stage to the refrigerant. The absorption subcooler is further operable to discharge the refrigerant to a gas cooler operable to apply a second cooling stage to the refrigerant.

According to another embodiment, a refrigeration system is operable to circulate refrigerant through the refrigeration system in order to cool a refrigeration load. The refrigeration system comprises a compressor operable to receive the refrigerant from the refrigeration load and compress the refrigerant; an absorption subcooler comprising a first heat exchanger and a second heat exchanger, the first heat exchanger operable to receive the compressed refrigerant from the compressor and to apply a first cooling stage to the compressed refrigerant; and a third heat exchanger external from the absorption subcooler and operable to receive the refrigerant that has been cooled by the first heat exchanger and to apply a second cooling stage to the refrigerant. The second heat exchanger of the absorption subcooler is operable to receive the cooled refrigerant from the third heat exchanger, apply a third cooling stage to the refrigerant, and discharge the refrigerant to an expansion valve operable to supply the refrigerant to the refrigeration load. In certain embodiments, the absorption subcooler is powered by heat absorbed by the first heat exchanger. In certain embodiments, the refrigerant is a natural refrigerant such as a hydrocarbon (HC) including propane, isobutane, carbon dioxide, ammonia, water, and air. In other embodiments, the refrigerant is a synthetic refrigerant (also referred to as a "man-made" refrigerant) such as chlorofluorocarbons (CFCs), hydroclorofulorocarbons (HCFCs), and hydrofluorocarbons (HFCs). In certain embodiments, the absorption subcooler is configured to circulate an absorption subcooler refrigerant and the absorption subcooler refrigerant is one of: ammonia and lithium bromide. In certain embodiments, the absorption subcooler further comprises: a condenser operable to receive the absorption subcooler refrigerant in a gaseous state and condense the absorption subcooler refrigerant into a liquid state; and an absorption chamber operable to receive the absorption subcooler refrigerant and mix the absorption subcooler refrigerant with water.

Certain problems can be envisioned with respect to known refrigeration systems. In general, refrigeration systems control the temperature and pressure of refrigerant as it moves through the refrigeration system. In certain known refrigeration systems, refrigerant is discharged from refrigeration cases to a compressor. The compressor compresses the refrigerant and discharges the refrigerant directly to a heat exchanger (e.g., gas cooler or condenser). The heat exchanger cools the refrigerant and discharges the refrigerant to components that supply the refrigerant to the refrigerated cases. Unfortunately, such known refrigeration systems may be characterized by certain inefficiencies. Certain embodiments of the present disclosure may provide a solution to this and/or other problems.

Certain embodiments may provide one or more technical advantages. An embodiment of the present disclosure may configure a refrigeration system with an absorption subcooler that provides cooling of refrigerant entering and/or exiting a gas cooler. Including the absorption subcooler may allow for more efficient operation of refrigeration system. As an example, the absorption subcooler may be powered by waste heat, rather than a separate power source, which may allow the absorption subcooler to efficiently cool the refrigerant.

In certain embodiments, the refrigeration system configured with the absorption subcooler may consume less power than would otherwise be required to cool the refrigerated cases if the absorption subcooler was not present. As an example, the absorption subcooler may cool the refrigerant prior to sending the refrigerant to the heat exchanger so that the heat exchanger performs less cooling and therefore consumes less energy.

As another example, the absorption subcooler may discharge refrigerant to downstream components, such as an expansion valve and flash tank that feed the refrigerated cases. The refrigerant discharged from the absorption subcooler may be cooler than refrigerant that the gas cooler would have otherwise discharged to the downstream components if the absorption subcooler was not present. Supplying cooler refrigerant to the downstream components may reduce the power required to cool the refrigerated cases. For example, fans may be able to work at a lower speed and compressors may be able to work at a lower frequency when cooler refrigerant is supplied to the refrigerated cases.

In certain embodiments, the mass flow rate of flash gas discharged from a flash tank may be less if the refrigeration system is configured with an absorption subcooler, which may allow for improved energy efficiency.

Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 4 of the drawings, like numerals being used for like and corresponding parts of the various drawings.

Generally, a refrigeration cycle includes circulating refrigerant through one or more refrigeration components, including at least one compressor, a heat exchanger (e.g., a condenser or gas cooler), at least one valve, and one or more evaporators. To ensure the system operates as intended, each component requires sufficient power, which may vary depending on the refrigeration load. The present disclosure contemplates a system and method for efficiently operating a refrigeration system.

During typical operation of a conventional refrigeration system, one or more components of the system will give off heat. The heat emitted from system components will be referred to herein as "waste heat." The present disclosure recognizes utilizing waste heat of refrigeration components to power an absorption subcooler operable to provide supplemental cooling to refrigerant. The addition of an absorption subcooler to a refrigeration system may provide various efficiency benefits such as a reduction in flash gas flow and a reduction in overall power consumption relative to refrigeration systems that do not include an absorption subcooler. The reduction in flash gas flow may be due to the reduction in refrigerant vapor moving through a flash tank and overall power consumption may be reduced due to the reduction in power utilized by one or more components of the refrigeration system (e.g., the gas cooler and the compressors).

Recently there has been an effort to make refrigeration systems more environmentally-friendly. As part of this effort, manufacturers have developed refrigeration systems that circulate natural refrigerant such as carbon dioxide ($CO_2$), propane ($C_3H_8$), isobutane ($C_4H_{10}$), water ($H_2O$), and air. Such natural refrigerants are circulated as a substitute for synthetic refrigerants such as CFCs, HCFCs, and HFCs that are associated with contributing to ozone depletion and/or global warming effects. Natural refrigerants are typically associated with higher compressor discharge temperatures than synthetic refrigerants. As a result, the natural refrigerant vapor is typically too hot to condense in a traditional condenser and thus, refrigeration systems circulating natural refrigerants include a gas cooler in lieu of a condenser. Just as a condenser in a traditional refrigeration system provides cooling to refrigerant, a gas cooler provides cooling to the natural refrigerant. However, in contrast to a condenser in a traditional refrigeration system, the refrigerant does not change states from a gas to a liquid in the gas cooler. Rather, the natural refrigerant undergoes a partial state change from gas to liquid as it is discharged from an expansion valve (e.g., expansion valve 140a of FIG. 1).

This disclosure makes reference to several example temperatures and pressures throughout and one of ordinary skill will recognize that such referenced temperatures and pressures may be sufficient for refrigeration systems circulating a particular refrigerant and may not be sufficient for refrigeration systems circulating other refrigerants. The example temperatures and pressures provided herein are tailored to a transcritical refrigeration system (i.e., a refrigeration system in which the heat rejection process occurs above the critical point) comprising a gas cooler and circulating $CO_2$. An example is made of such system because the efficiency benefits are easily recognized in a refrigeration system circulating natural refrigerant. In particular, more waste heat is generated (and therefore available for use by an absorption subcooler) in a system circulating natural refrigerant because natural refrigerants are associated with higher compressor discharge temperatures than synthetic refrigerants. Although this disclosure primarily describes a transcritical refrigeration system, this disclosure recognizes similar benefits may be recognized in other direct expansion (DX) refrigeration systems such as those refrigeration systems comprising a condenser and circulating synthetic refrigerant.

Figure 1:
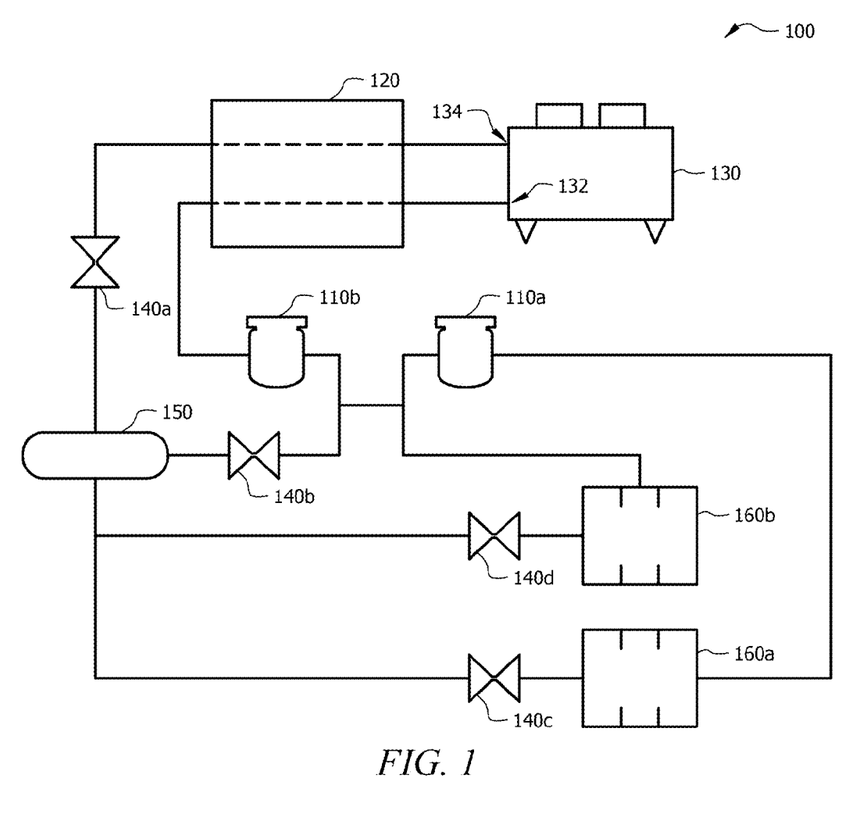
FIG. 1 illustrates an example of $CO_2$ refrigeration system comprising an absorption subcooler, according to certain embodiments of the present disclosure.

Turning now to FIG. 1, refrigeration system 100 includes compressors 110, an absorption subcooler 120, a gas cooler 130, one or more valves 140, a flash tank 150, and one or more evaporators 160. In some embodiments, refrigeration system 100 circulates a natural refrigerant and maintains a cooled environment for evaporators 160. As further discussed below, evaporators 160 may represent a refrigeration load, such as a low temperature refrigeration case for storing frozen food (e.g., evaporator 160a) and a medium temperature refrigeration case for storing fresh food (e.g., evaporator 160b). Components of refrigeration system (e.g., compressors 110, an absorption subcooler 120, a gas cooler 130, one or more valves 140, a flash tank 150, and one or more evaporators 160) may be connected via any suitable conduit. As used herein, components of refrigeration system 100 are connected via tubing through which the refrigerant travels. As described above, this disclosure recognizes efficiency benefits of including absorption subcooler 120 in refrigeration system 100.

Refrigeration system 100 includes at least one compressor 110. As depicted in FIG. 1, refrigeration system 100 includes compressors 110a and 110b. Compressor 110a may, in some embodiments, be a low temperature compressor configured to compress refrigerant from a low temperature evaporator (e.g., evaporator 160a). Compressor 110b may, in some embodiments, be a medium temperature compressor configured to compress refrigerant from a medium temperature evaporator (e.g., evaporator 160b). Refrigeration system 100 may include any suitable number of compressors 110. Although this disclosure describes and depicts refrigeration system 100 including only two compressors 110, this disclosure recognizes that refrigeration system 100 may include any suitable number of compressors 110. Compressors 110 may vary by design and/or by capacity.

Refrigeration system 100 may also include an absorption subcooler 120. Absorption subcooler 120 is operable to cool refrigerant cycling through refrigeration system 100. In some embodiments, absorption subcooler 120 is powered by waste heat emitted from one or more components of refrigeration system 100. For example, absorption subcooler 120 may be powered by the heat emitted from compressors 110 and/or gas cooler 130.

As depicted in FIG. 1, absorption subcooler 120 may be connected to other components of system 100 by tubing through which the refrigerant runs. For example, absorption subcooler 120 may connect to one or more compressors 110 and gas cooler 130. In some embodiments, absorption subcooler 120 receives compressed refrigerant from compressors 110 and applies a first cooling stage to the compressed refrigerant using a first heat exchanger (e.g., heat exchanger 230 of FIG. 2). Refrigerant is cooled during the first cooling stage. As used herein, "cooled" or "cooling" or "cool" refers to a lowering of the temperature of refrigerant. In some embodiments, absorption subcooler 120 cools refrigerant during the first cooling stage by absorbing the heat of the compressed refrigerant. The first cooling stage may permit refrigerant to be cooled by an amount in the range of 15° C.-24° C. After absorption subcooler 120 applies the first cooling stage to refrigerant, absorption subcooler 120 may be configured to discharge the cooled refrigerant to gas cooler 130 (discussed below).

In some embodiments, absorption subcooler 120 may receive refrigerant from gas cooler 130 after gas cooler 130 has applied a second cooling stage to refrigerant. Absorption subcooler 120 may then, in some embodiments, apply a third cooling stage to refrigerant. Absorption subcooler 120 applies a third cooling stage using a second heat exchanger (e.g., heat exchanger 250 of FIG. 2) in some embodiments. The third cooling stage may permit refrigerant to be cooled by an amount in the range of 2° C.-4° C. After applying the third cooling stage to the refrigerant, absorption subcooler 120 discharges the refrigerant. In some embodiments, absorption subcooler 120 discharges the refrigerant to an expansion valve 140a. More details of absorption subcooler 120 will be described below in reference to FIG. 2.

Although this disclosure describes and depicts absorption subcooler 120 applying two cooling stages to refrigerant circulating through refrigeration system 100, this disclosure recognizes that absorption subcooler 120 may apply any suitable number of cooling stages. For example, this disclosure recognizes that absorption subcooler may only apply only one of the two cooling stages described above. As another example, this disclosure recognizes that absorption subcooler 120 may apply more than two cooling stages.

Refrigeration system 100 may also include gas cooler 130. Gas cooler 130 is operable to apply a second cooling stage to refrigerant in some embodiments. Gas cooler 130 may be a heat exchanger. In some embodiments, gas cooler 130 comprises an inlet connection 132 and an outlet connection 134 to absorption subcooler 120. Inlet connection 132 may be configured to receive compressed refrigerant from absorption subcooler 120 and outlet connection 134 may be configured to provide cooled refrigerant from gas cooler 130 to absorption subcooler 120. Gas cooler 130 may be configured to cool refrigerant by an amount in the range of 50° C.-90° C. during the second cooling stage. In some embodiments, after gas cooler 130 has applied the second cooling stage, refrigerant is discharged from gas cooler 130 to absorption subcooler 120.

Refrigeration system 100 includes valve 140a in some embodiments. Valve 140a may be an expansion valve in some embodiments. Expansion valve 140a may be connected, via a tubing connection, to absorption subcooler 120 and flash tank 150. In some embodiments, expansion valve 140a is configured to receive refrigerant from absorption subcooler 120 and control the flow of refrigerant to flash tank 150. Controlling the flow of the refrigerant may comprise reducing the pressure of the refrigerant, thereby producing a refrigerant mixture comprising both liquid and vapor refrigerant. The refrigerant mixture produced by expansion valve 140a may be provided to flash tank 150 in some embodiments.

Refrigeration system 100 includes a flash tank 150 in some embodiments. Flash tank 150 may be configured to separate the refrigerant mixture into liquid refrigerant and refrigerant vapor. In some embodiments, flash tank 150 separates the refrigerant mixture using an inlet and collects refrigerant precipitates at the bottom of flash tank 150. Flash tank 150 may be connected via tubing to evaporators 160 and compressors 110 and may be configured to discharge the liquid refrigerant to evaporators 160 and the refrigerant vapor (also referred to herein as "flash gas") to compressors 110. Before reaching compressors 110 and/or evaporators 160, refrigerant may contact one or more valves (e.g., valve 140b-d). For example, as depicted in FIG. 1, flash gas flows through tubing to a flash gas valve 140b. In some embodiments, flash gas valve 140b controls the flow of flash gas to one or more compressors 110. As depicted, flash gas valve 140b controls the flow of flash gas to compressor 110b.

Figure 2:
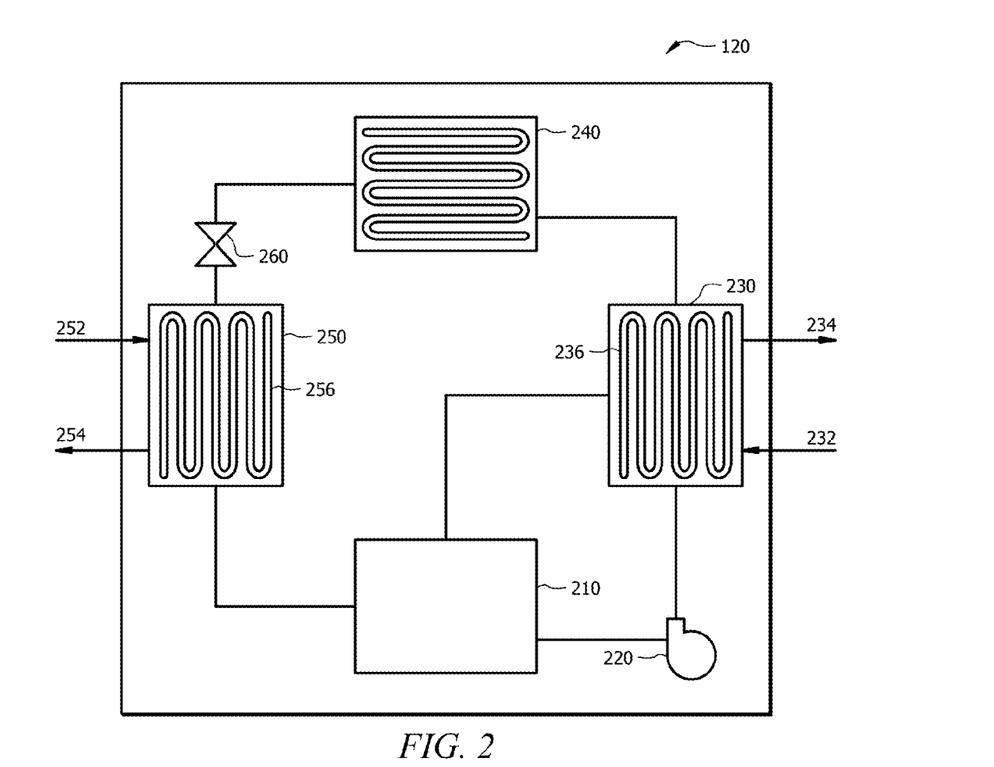
FIG. 2 illustrates the absorption subcooler of FIG. 1, according to certain embodiments of the present disclosure.

Refrigeration system 100 may also include one or more evaporators 160 in some embodiments. Evaporators 160 may represent a refrigeration load. In some embodiments, evaporators 160 are refrigerated cases such as refrigerated cases in grocery stores. Refrigeration system 100 may provide refrigerated cases with refrigerant of one temperature, or, with refrigerant of multiple temperatures. For example, as depicted in FIG. 2, evaporator 160a may be a low-temperature refrigerated case (e.g., refrigeration system 100 provides evaporator 160a with refrigerant having a temperature of −30° C.). As another example, evaporator 160b may be a medium-temperature case (e.g., refrigeration system 100 provides evaporator 160b with refrigerant having a temperature of −6° C.). In some embodiments, the passing of refrigerant through valve 140c and/or 140d changes the temperature of the refrigerant relative to the temperature of the refrigerant leaving flash tank 150. As an example, the temperature of the refrigerant leaving flash tank 150 may be 2° C. and, after flowing through valve 140c, refrigerant may be −30° C. As another example, the temperature of the refrigerant leaving flash tank 150 may be 2° C. and, after flowing through valve 140d, refrigerant may be −6° C. In providing cooling to refrigerated cases 160, the refrigerant is heated and changes states from a liquid to a vapor. In some embodiments, the warm vapor flows back to compressors 110 and the cycle is repeated.

Although this disclosure describes and depicts refrigeration system 100 including certain components, this disclosure recognizes that refrigeration system 100 may include any suitable components. As an example, refrigeration system 100 may include one or more sensors configured to detect temperature and/or pressure information. In some embodiments, each of compressors 110, absorption subcooler 120, gas cooler 130, flash tank 150, and evaporators 160 include one or more sensors. As another example, refrigeration system 100 may include a controller operable to communicate with one or more components of refrigeration system 100. An example of a controller of refrigeration system 100 will be explained in further detail below in reference to FIG. 4.

Figure 3:
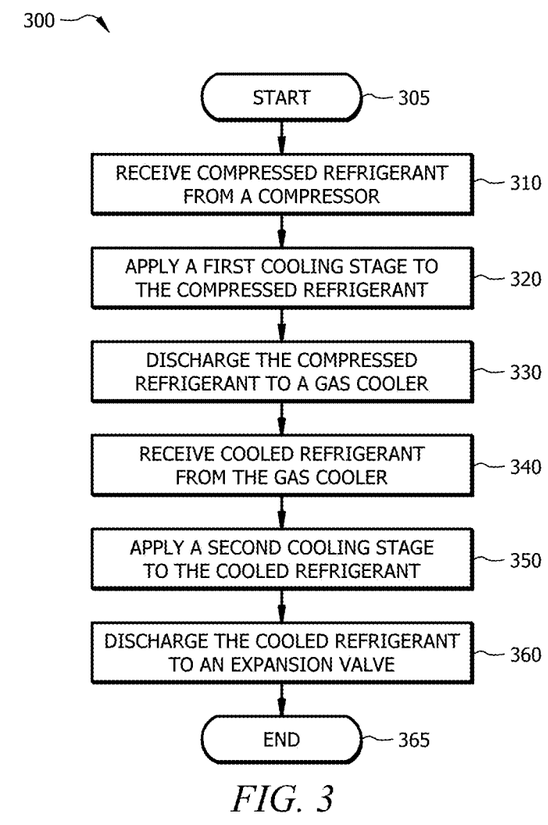
FIG. 3 illustrates a method of operation of the absorption subcooler of FIG. 2, according to certain embodiments.
Figure 4:
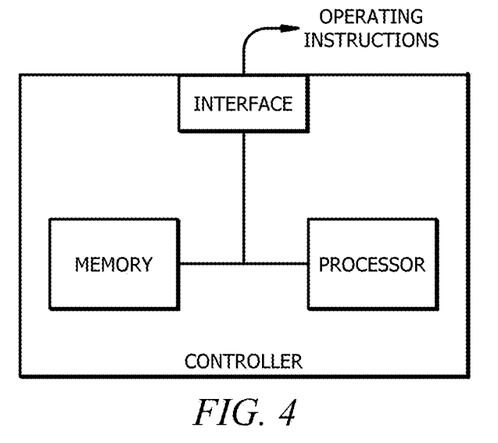
FIG. 4 illustrates an example controller operable to control one or more components, including the absorption subcooler of FIG. 2, of the refrigeration system of FIG. 1.

In operation, refrigerant is compressed by compressors 110 and provided to absorption subcooler 120 for a first cooling stage before being discharged to gas cooler 130. Upon being received at gas cooler 130, the refrigerant undergoes a second cooling stage and is discharged back to absorption subcooler 120 for a third cooling stage. This disclosure recognizes that cooling refrigerant with absorption subcooler 120 may be associated with various efficiencies and permits other components of refrigeration system 100 from operating more than necessary. FIG. 2 illustrates absorption subcooler 120 in more detail and FIG. 3 illustrates one embodiment of a method performed by absorption subcooler 120. Finally, FIG. 4 illustrates an example of a controller that is configured to operate each component of refrigeration system 100, including absorption subcooler 120.

As described above, FIG. 2 illustrates absorption subcooler 120 of refrigeration system 100. Absorption subcooler 120 may include one or more components and may be configured to circulate absorption subcooler refrigerant. In one embodiment, such as depicted in FIG. 2, absorption subcooler 120 comprises an absorption chamber 210, a pump 220, a first heat exchanger 230, a condenser 240, and a second heat exchanger 250. In some embodiments, absorption subcooler refrigerant is a natural refrigerant such as ammonia ($NH_3$) or lithium bromide (LiBr).

Absorption subcooler 120 may be configured to absorb waste heat and use the absorbed waste heat to power one or more components of absorption subcooler 120. As one example, absorption subcooler 120 may absorb heat emitted from one or more components of refrigeration system 100 (e.g., a compressor 110, gas cooler 130). As another example, absorption subcooler 120 may absorb heat from other sources such as heat from the sun (solar heat), heat rejection from other systems (e.g., Heating Ventilation and Air Conditioning (HVAC) system), and compressor discharge from other systems (e.g., HVAC system). Thus, absorption subcooler 120 uses waste heat to power operations of one or more components of absorption subcooler 120. As one example, the absorbed waste heat may power heat exchangers 230, 250 such that they may apply a cooling stage to refrigerant. As another example, the absorbed waste heat may power operations of absorption chamber 210, pump 220, and/or condenser 240. As illustrated in FIG. 2, absorption subcooler 120 absorbs heat from compressors 110 and gas cooler 130 and uses the absorbed heat to power all operations of absorption subcooler 120.

In some embodiments, absorption subcooler 120 includes an absorption chamber 210. Absorption chamber 210 may be configured to receive absorption subcooler refrigerant (e.g., $NH_3$) in vapor form and mix the absorption subcooler refrigerant with water to produce a solution of absorption subcooler refrigerant and water. Absorption chamber 210 may be connected via tubing to one or more components of absorption subcooler 210. For example, as illustrated in FIG. 2, absorption chamber 210 is connected to pump 220, first heat exchanger 230, and second heat exchanger 250. As such, absorption chamber 210 may be configured to receive absorption subcooler refrigerant from first and second heat exchangers 230, 250 and to discharge the absorption subcooler refrigerant-water solution to pump 220. In operation, absorption chamber 210 may receive absorption subcooler refrigerant in vapor form from second heat exchanger 250 and receive water from first heat exchanger 230. Absorption chamber 210 may then mix the absorption subcooler refrigerant and water to form a solution and discharge the solution to pump 220. Pump 220 may be configured to force the absorption subcooler refrigerant-water solution into first heat exchanger 230.

Absorption subcooler 120 includes heat exchanger 230 in some embodiments. Heat exchanger 230 may be configured to apply a first cooling stage to refrigerant being pushed through absorption subcooler 120. Heat exchanger 230 may be connected to one or more components of refrigeration system 100, including one or more components of absorption subcooler 120. As illustrated in FIGS. 1 and 2, heat exchanger 230 comprises an inlet connection 232 from compressors 110 and an outlet connection 234 to gas cooler 130. Additionally, first heat exchanger 230 comprises connections to pump 220, absorption chamber 210, and condenser 240. In some embodiments, first heat exchanger 230 receives the absorption subcooler refrigerant-water solution (produced in absorption chamber 210) from pump 220. Heat exchanger 230 may also be configured to circulate the solution through a coil system 236 within heat exchanger 230 and separate the absorption subcooler refrigerant from the water. In some embodiments, separation of the solution is performed by forcing compressed refrigerant from compressors 110 through first heat exchanger 230. In doing so, the solution circulating through coil system 236 absorbs heat from the hot, compressed refrigerant. In some embodiments, absorbing the heat from the compressed refrigerant reduces the temperature of the compressed refrigerant by 120° C. to 96° C. The absorption of heat may cause the solution to separate into water and subcooler refrigerant vapor. In some embodiments, heat exchanger 230 is further configured to discharge the water back to absorption chamber 210 and to discharge the subcooler refrigerant vapor to condenser 240.

In some embodiments, absorption subcooler 120 includes a condenser 240. Condenser 240 may be configured condense absorption subcooler refrigerant from a vapor form to a liquid form. In some embodiments, condenser 240 is connected via tubing to one or more components of absorption subcooler 120. For example, as depicted in FIG. 2, condenser 240 is connected to first heat exchanger 230 and second heat exchanger 250. In such an embodiment, condenser 240 may receive absorption subcooler refrigerant in vapor form from first heat exchanger 230 and, after condensing absorption subcooler refrigerant into liquid form, discharge absorption subcooler refrigerant to second heat exchanger 250. Cooling absorption subcooler refrigerant from a vapor form to a liquid form may involve the use of a coil system 242. For example, as depicted in FIG. 2, absorption subcooler refrigerant arrives at condenser 240 in vapor form and travels through coil system 242 of condenser 240. As absorption subcooler refrigerant travels through coil system 242, coils of coil system 242 absorb the latent heat from the absorption subcooler refrigerant, thereby changing the state of the absorption subcooler refrigerant from gas to liquid. After traveling through coil system 242 of condenser 240, liquid-state, absorption subcooler refrigerant is discharged at a high pressure-low temperature to an absorption subcooler expansion valve 260. Absorption subcooler expansion valve 260 may be configured to control the amount of flow of absorption subcooler refrigerant to second heat exchanger 250. In some embodiments, sending absorption subcooler refrigerant through absorption subcooler expansion valve 260 results in a low temperature-low pressure absorption subcooler refrigerant in the liquid state.

Absorption subcooler 120 may also comprise heat exchanger 250 in some embodiments. As described above, heat exchanger 250 may be configured to receive refrigerant and apply a cooling stage to the received refrigerant. Accordingly, heat exchanger 250 is connected via tubing to one or more components of refrigeration system 100, including components of absorption subcooler 120. For example, as depicted in FIG. 2, heat exchanger 250 may comprise an inlet connection 252 from gas cooler 130 and an outlet connection 254 to expansion valve 140a. As another example, absorption subcooler 120 may be connected via tubing to condenser 240 and absorption chamber 210 in some embodiments. In some embodiments, heat exchanger 250 receives low temperature-low pressure absorption subcooler refrigerant in a liquid state from condenser 240 after it passes through valve 260.

Heat exchanger 250 may comprise a coil system 256 in some embodiments. In such an embodiment, received absorption subcooler refrigerant is forced through coil system 256 of second heat exchanger 250. While the low temperature-low pressure absorption subcooler refrigerant travels through coil system 256, coils of coil system 256 absorb the latent heat of refrigerant passing through heat exchanger 250. As a result, the heat from the refrigerant is transferred to coils of coil system 256 which further transfers the heat to absorptions subcooler refrigerant travelling through coil system 256. Accordingly, refrigerant is cooled and absorption subcooler refrigerant is heated (increase in temperature of absorption subcooler refrigerant). Heating of absorption subcooler refrigerant causes absorption subcooler refrigerant to evaporate, thereby changing from a liquid state to a vapor state. As described above, after heat exchanger 250 applies a cooling stage to the refrigerant, heat exchanger 250 discharges the refrigerant to expansion valve 140a through outlet connection 254. As for absorption subcooler refrigerant, after traveling through coil system 256, absorption subcooler refrigerant is discharged in vapor form to absorption chamber 210 where it will be mixed with water to produce a solution of absorption subcooler refrigerant and water. The cycle may then repeat starting with the operation of absorption chamber 210.

FIG. 3 illustrates a method 300 that may be performed by one or more components of refrigeration system 100. As an example, the steps of method 300 may be performed by absorption subcooler 120. The method 300 begins in a step 305 and continues to step 310. At step 310, absorption subcooler 120 receives compressed refrigerant. In some embodiments, absorption subcooler 120 may receive compressed refrigerant from one or more compressors 110. In some embodiments, such as that depicted in FIG. 2, heat exchanger 230 receives compressed refrigerant through inlet connection 232. As depicted in FIG. 1, absorption subcooler 120 receives compressed refrigerant directly from compressor 110b, however compressor 110b also receives compressed refrigerant from compressor 110a. In some embodiments, method 300 continues to step 320.

At step 320, absorption subcooler 120 applies a cooling stage to the compressed refrigerant. In some embodiments, the cooling stage is applied by a heat exchanger. As depicted in FIG. 2, the cooling stage is applied by heat exchanger 230. In some embodiments, the cooling stage comprises absorbing sensible heat from refrigerant passing over coil system 236. Stated differently, coils of coil system 236 may absorb heat from compressed refrigerant passing over coil system 236. In some embodiments, the cooling stage applied by heat exchanger 230 may reduce the temperature of the refrigerant between 5° C.-30° C. As one example, the heat exchanger may receive refrigerant from compressor 110 at a temperature in the range of 110° C. to 130° C., such as approximately 120° C., and may discharge refrigerant to gas cooler 130 at a temperature in the range of 85° C. to 105° C., such as approximately 96° C. The heat absorbed by the coils may be transferred to the solution of absorption subcooler refrigerant and water that is traveling through coil system 236. In some embodiments, heating the solution causes the solution to separate into water and absorption subcooler refrigerant vapor. In some embodiments, method 300 continues to a step 330.

At step 330, absorption subcooler 120/heat exchanger 230 discharges the compressed refrigerant. In some embodiments, such as that depicted in FIG. 2, heat exchanger 120 discharges the compressed refrigerant to gas cooler 130 via outlet connection 234. In some embodiments, gas cooler 130 applies a cooling stage to the refrigerant received from absorption subcooler 120. The cooling stage applied by gas cooler 130 may reduce the temperature of the refrigerant between 30° C.-70° C. As one example, the gas cooler may receive refrigerant from absorption subcooler 120 at a temperature in the range of 90° C. to 110° C., such as approximately 96° C., and may discharge refrigerant to absorption subcooler at a temperature in the range of 25° C. to 45° C. In some embodiments, the method 300 continues to a step 340.

At step 340, absorption subcooler 120 receives cooled refrigerant. In some embodiments, absorption subcooler 120 receives cooled refrigerant from gas cooler 130. For example, as depicted in FIG. 2, heat exchanger 250 of absorption subcooler receives cooled refrigerant from gas cooler 130 via inlet connection 252. In some embodiments, the method 300 continues to step 350.

At step 350, absorption subcooler 120 applies a cooling stage to the cooled refrigerant. In some embodiments, the cooling stage is applied by a heat exchanger. For example, as depicted in FIG. 2, the cooling stage is applied by heat exchanger 250. In some embodiments, the cooling stage comprises absorbing latent heat from refrigerant passing over coil system 256. Stated differently, coils of coil system 256 may absorb heat from cooled refrigerant passing over coil system 256. In some embodiments, the cooling stage applied by heat exchanger 250 may reduce the temperature of the refrigerant between 2° C.-4° C. As an example, the absorption subcooler may receive refrigerant from gas cooler 130 at a temperature in the range of 32° C. to 42° C., such as approximately 37° C., and may discharge refrigerant to expansion valve 140a at a temperature in the range of 25° C. to 38° C. The heat absorbed by the coils of coil system 256 may be transferred to the absorption subcooler refrigerant traveling through coil system 236. In some embodiments, heating the absorption subcooler refrigerant causes the absorption subcooler refrigerant to change states from a liquid state to a vapor state. In some embodiments, method 300 continues to a step 360.

At step 360, heat exchanger 120 discharges the compressed refrigerant. In some embodiments, such as that depicted in FIG. 2, heat exchanger 250 discharges the cooled refrigerant to expansion valve 140a via outlet connection 254. Expansion valve 140a may control the flow of refrigerant to one or more evaporators 160 and each evaporator 160 may be associated with a particular load. For example, as depicted in FIG. 1, evaporator 160a may be a low temperature load and evaporator 160b may be a medium temperature load. Accordingly, expansion valve 140 may supply the discharged refrigerant to a refrigeration load. In some embodiments, the method 300 continues to an end step 365.

The method 300 may include one or more additional steps. For example, the method 300 may also include a step comprising condensing the absorption subcooler refrigerant from a gaseous state into a liquid state using a condenser and/or mixing the absorption subcooler refrigerant with water. As described above, condenser 240 of absorption subcooler 120 may perform the condensing step and absorption chamber 210 may perform the mixing step.

In another method (not depicted), two or more components of refrigeration system 100 perform one or more steps. For example, refrigeration system 100 may perform a method comprising steps 305-360 above, and also comprise other steps performed by other components of refrigeration system 100. As an example, the method may also comprise one or more of: compressing refrigerant using one or more compressors (e.g., compressors 110), applying a cooling stage to refrigerant using a gas cooler (e.g., gas cooler 130), separating refrigerant into liquid refrigerant and refrigerant vapor using a flash tank (e.g., flash tank 150), and evaporating refrigerant using one or more evaporators 160.

Finally, FIG. 4 illustrates an example of a controller 400 that may be operable to control one or more components of refrigeration system 100. Controller 400 may comprise one or more components. For example, as depicted in FIG. 4, controller 400 includes an interface 410, a memory 420, and a processor 430. In some embodiments, each component of controller 400 is communicably coupled and the components permit instructions to be sent from controller 400 to other components of refrigeration system 100. In some embodiments, controller 400 may provide instructions to components of refrigeration system 100 via an appropriate communications link (e.g., wired or wireless) or analog control signal.

In some embodiments, controller 400 includes an interface 410. Interface 410 may be configured to receive information. In some embodiments, interface 410 receives information continuously. In other embodiments, interface 410 receives information periodically. As an example and not by way of limitation, interface 410 may receive information from one or more sensors of refrigeration system 100. For example, interface 410 may receive temperature and pressure information from one or more compressors 110, absorption subcooler 120, gas cooler 130, flash tank 150 and evaporators 160. In some embodiments, interface 410 may store the received information in memory 420 and/or send the received information to processor 430 for processing. As another example, interface 410 may receive other control information such as information about one or more setpoints. Setpoint information may be received from one or more operators of controller 400 (e.g., manufacturer or user of refrigeration system 100). The one or more setpoints may comprise information about a threshold for discharging refrigerant. As an example and not by way of limitation, interface 410 may receive three different setpoints: (1) a setpoint associated with a temperature of compressed refrigerant discharged from absorption subcooler 120; (2) a setpoint associated with a temperature of cooled refrigerant discharged from gas cooler 130; and (3) a setpoint associated with a temperature of cooled refrigerant discharged from absorption subcooler 120. Although certain setpoints have been described, this disclosure recognizes that interface 410 may receive information about any other setpoints (e.g., temperature of refrigerant being compressed by compressors 110, temperature of refrigerant being evaporated by evaporators 160, temperature of refrigerant within flash tank 150). Interface 410 may also receive any other suitable information.

Additionally, interface 410 may be configured to send instructions to one or more components of refrigeration system 100. For example, processor 430 may generate instructions for one or more components of refrigeration system 100 (e.g., compressors 110, absorption subcooler 120, gas cooler 130, flash tank 150, evaporators 160) and interface 410 may relay those instructions to the intended component of refrigeration system 100. As an example, in response to receiving instructions for absorption subcooler 120, interface 410 sends the instructions to absorption subcooler 120.

In some embodiments, controller 400 includes memory 420. Memory 420 of controller 400 may be configured to store information. The information stored by memory 420 may comprise data detected by one or more sensors of refrigeration system 100, setpoint information received from one or more operators, and/or any other suitable information. In some embodiments, suitable information may include operating instructions of refrigeration system 100. Operating instructions may comprise instructions about the temperature and/or pressure of refrigerant as it leaves, or is received by, a component of refrigeration system 100 (e.g., refrigerant is discharged from gas cooler 130 when it is cooled to at least 37° C., cooled refrigerant is discharged from absorption subcooler 120 when it is cooled to at least 34° C.).

Controller 400 also includes a processor 430 in some embodiments. Processor 430 may be configured to receive information from interface 410 and/or memory 420 and process the received information. In some embodiments, processor 430 may also be configured to generate instructions for one or more components of refrigeration system 100 after processing the received information. For example, operating instructions stored in memory 420 may recite that refrigerant is to be discharged from gas cooler 130 after it cools refrigerant 60° C. Interface 410 may receive temperature information from one or more sensors of gas cooler 130. Specifically, interface 410 may receive information from gas cooler 410 that refrigerant was 96° C. when the refrigerant entered gas cooler 410 and may receive, and relay to processor 430, temperature updates as gas cooler 130 applies a cooling stage to the refrigerant. Upon receiving information from interface 410 that the temperature of the refrigerant in gas cooler 130 has reached 36° C., processor 430 may generate an instruction for gas cooler 130 to discharge the refrigerant. In some embodiments, this instruction is sent directly from processor 430 to interface 410, and interface 410 sends the instruction to gas cooler 130. It will be understood that processor 430 may controls various operations of components of refrigeration system 100 in a similar manner.

Although this disclosure describes and depicts using an absorption subcooler to supplement cooling of refrigerant in a transcritical refrigeration system, this disclosure recognizes other applications as well. For example, this disclosure recognizes using an absorption subcooler to supplement cooling in DX refrigeration systems comprising condensers and circulating synthetic refrigerants. In such systems, the condenser receives refrigerant that has been cooled by the first heat exchanger of the absorption subcooler and applies a cooling stage to the refrigerant before discharging the refrigerant back to the absorption subcooler for further cooling.

Similarly, this disclosure recognizes using an absorption subcooler to supplement cooling in an HVAC system. For example, absorption subcooler may provide supplemental cooling to refrigerant circulating through an HVAC system. In such an embodiment, absorption subcooler may be configured to receive compressed refrigerant from one or more compressors and apply a cooling stage to the refrigerant before discharging the compressed refrigeration to a condenser of an HVAC system. The condenser of the HVAC system may apply a cooling stage to the refrigerant received from the absorption subcooler before discharging the refrigerant back to the absorption subcooler for another cooling stage.

Embodiments of the present disclosure may have one or more technical advantages. In certain embodiments, refrigeration system 100 includes an absorption subcooler 120. The inclusion of absorption subcooler 120 may allow for reducing power consumption that would otherwise be consumed by refrigeration system 100 if absorption subcooler 120 was not present. As an example, one embodiment of refrigeration system 100 having a $CO_2$ transcritical booster configuration (300 kW) and a 0.68 Coefficient of Performance (COP) may achieve a 2.9° C. reduction in the temperature of refrigerant supplied to expansion valve 140a and a 35.2% reduction in system power consumption based on the addition of absorption subcooler 120.

First consider a refrigeration system 100 similar to that shown in FIG. 1, however, without the addition of absorption subcooler 120 (e.g., such that compressor 110 would discharge refrigerant directly to gas cooler 130, and gas cooler 130 would discharge refrigerant directly to expansion valve 140a). Such a refrigeration system may have a flash gas mass flow rate of 1757 Kg/hr which requires 39.46 KW of power to operate compressors 110. In such a refrigeration system, one or more compressors 110 discharge refrigerant to gas cooler 130 at a high pressure and a high temperature (e.g., 1300 PSI and 120° C., respectively). Gas cooler 130 may apply a cooling stage to the refrigerant thereby reducing the temperature by about 80° C. For example, gas cooler may cool the refrigerant from 120° C. to 37° C. After applying the cooling stage, gas cooler 130 may then discharge the refrigerant to expansion valve 140a at a high pressure and a low temperature (e.g., 1300 PSI and 37° C., respectively). Expansion valve 140a may receive the refrigerant from gas cooler 130 and reduce the pressure of the refrigerant by adjusting the openness of expansion valve 140a. As an example, expansion valve 140a may reduce the pressure of the refrigerant from 1300 PSI to 532 PSI, thereby forming a mixture of refrigerant vapor and liquid refrigerant. As an example, at 2° C. and 532 PSI, the refrigerant mixture is about 46% refrigerant vapor and 54% liquid refrigerant. The refrigerant mixture flows from expansion valve 140a and enters flash tank 150 for separation.

In flash tank 150, the refrigerant mixture is separated into refrigerant vapor (flash gas) and liquid refrigerant. The flash gas is supplied to compressor 110b by flowing first through valve 140b. Valve 140b may further reduce the pressure of the flash gas to a pressure similar to that of the pressure of refrigerant vapor discharged from compressor 110a. For example, valve 140b may receive flash gas with a pressure of 532 and reduce the pressure of the flash gas to a pressure of 430 PSI, the same pressure as the pressure of refrigerant discharged from compressor 110a. As for the remaining refrigerant in flash tank 150, liquid refrigerant precipitates at the bottom of flash tank 150 and is discharged to valves 140c and 140d to provide cooling for evaporators 160a and 160b. The openness of valves 140c and 140d may control the temperature and pressure of the liquid refrigerant reaching evaporators 160a and 160b. For example, the temperature and pressure of the refrigerant supplied to case 160a may be −30° C. and 207 PSI, respectively, and the temperature and pressure of the refrigerant supplied to case 160b may be −6° C. and 430 PSI, respectively. Evaporation occurs in evaporators 160, thereby causing the liquid refrigerant supplied to cases 160 to change to vapor. Vapor from case 160a may be discharged to compressor 110a at a first temperature and pressure and vapor from case 160b may be discharged to compressor 110b at a second temperature and pressure. After the vapor from case 160a is compressed by compressor 110a, the vapor is discharged at a particular temperature and pressure. This temperature and pressure may be the same temperature and pressure as the temperature and pressure of the flash gas discharged from flash tank 150 and the temperature and pressure of the refrigerant vapor discharged from evaporator 160b. For example, the flash gas discharged from valve 140b, the refrigerant vapor discharged from evaporator 160b, and the refrigerant vapor discharged from compressor 110a may be at 430 PSI. At this juncture, the refrigerant of the same pressure mixes together and continues to flow to compressor 110b for compression.

Next, consider refrigeration system 100 with absorption subcooler 120 included, as shown in FIG. 1. As described above, absorption subcooler 120 is powered by waste heat and provides supplemental cooling to refrigeration system 100. The net refrigeration effect of using an absorption subcooler may be significant. For example, the net refrigeration effect produced by using absorption cooler 120 is 46.7 KW assuming that a 0.68 coefficient of performance and recovering 68.84 KW of heat from compressor discharge lines. The supplemental cooling provided by absorption subcooler may permit more refrigerant flowing through expansion valve 140a to change to a liquid state and be provided to cases 160. By increasing the amount of refrigerant vapor that becomes liquid refrigerant, the amount of refrigerant vapor that becomes flash gas (requiring compression) is decreased. Accordingly, by incorporating absorption subcooler 120, there is a reduction in both flash gas flow and power consumption relative to a refrigeration system 100 without absorption subcooler 120. For example, a refrigeration system 100 with absorption subcooler 120 may have a flash gas mass flow rate of 1139 Kg/hr (compared to the 1757 Kg/hr in a refrigeration system 100 without an absorption subcooler) which requires only 25.58 KW of power to compress (compared to the 39.46 KW of power needed to compress flash gas in a refrigeration system 100 without an absorption subcooler). In such example, a refrigeration system 100 with absorption subcooler 120 reduces flash gas flow and power consumption by 35.2%.

In a refrigeration system 100 with an absorption subcooler 120, one or more compressors 110 discharge refrigerant to absorption subcooler 120 at a high pressure and a high temperature (e.g., 1300 PSI and 120° C., respectively). Absorption subcooler 120 may apply a first cooling stage to the refrigerant thereby reducing the temperature by about 20° C. For example, absorption subcooler 120 may cool the refrigerant from 120° C. to 96° C. After applying the first cooling stage, absorption subcooler 120 may discharge the refrigerant to gas cooler 130. Gas cooler 130 may receive the refrigerant at about 96° C. and 1300 PSI and apply a second cooling stage to the refrigerant. The second cooling stage may reduce the temperature of the refrigerant by about 60° C. For example, gas cooler 130 may cool the refrigerant from 96° C. to 37° C. After applying the second cooling stage, gas cooler 130 may discharge the refrigerant to the absorption subcooler 120 for additional cooling. Absorption subcooler 120 may then apply a third cooling stage to the refrigerant. The third cooling stage may reduce the temperature of the refrigerant by about 3° C. For example, absorption subcooler 120 may cool the refrigerant from 37° C. to 34° C. during the third cooling stage. After applying the third cooling stage, absorption subcooler 120 may discharge the refrigerant to expansion valve 140a at a high pressure and a low temperature (e.g., 1330 PSI and 34.1° C., respectively). Expansion valve 140a may then reduce the pressure of the refrigerant by adjusting the openness of expansion valve 140a. As an example, expansion valve 140a may reduce the pressure of the refrigerant from 1330 PSI to 532 PSI, thereby forming a mixture of refrigerant vapor and liquid refrigerant. As an example, at 34.1° C. and 1330 PSI, the refrigerant mixture is about 39% refrigerant vapor and 61% liquid refrigerant. The refrigerant mixture flows from expansion valve 140a and enters flash tank 150 for separation. In flash tank 150, the refrigerant mixture is separated into refrigerant vapor (flash gas) and liquid refrigerant. The flash gas is supplied to compressor 110b by flowing first through valve 140b. Valve 140b may further reduce the pressure of the flash gas to a pressure similar to that of the pressure of refrigerant vapor discharged from compressor 110*a*. For example, valve 140*b* may receive flash gas with a pressure of 532 and reduce the pressure of the flash gas to a pressure of 430 PSI, the same pressure as the pressure of refrigerant discharged from compressor 110*a*. As for the remaining refrigerant in flash tank 150, liquid refrigerant precipitates at the bottom of flash tank 150 and is discharged to valves 140*c* and 140*d* to provide cooling effects for evaporators 160*a* and 160*b*. The openness of valves 140*c* and 140*d* may control the temperature and pressure of the liquid refrigerant reaching evaporators 160*a* and 160*b*. For example, the temperature and pressure of the refrigerant supplied to case 160*a* may be −30° C. and 207 PSI, respectively, and the temperature and pressure of the refrigerant supplied to case 160*b* may be −6° C. and 430 PSI, respectively. Evaporation occurs in evaporators 160, thereby causing the liquid refrigerant supplied to cases 160 to change to vapor. Vapor from case 160*a* may be discharged to compressor 110*a* at a first temperature and pressure and vapor from case 160*b* may be discharged to compressor 110*b* at a second temperature and pressure. After the vapor from case 160*a* is compressed by compressor 110*a*, the vapor is discharged at a particular temperature and pressure. This pressure may be the same pressure as the pressure of the flash gas discharged from flash tank 150 and the pressure of the refrigerant vapor discharged from evaporator 160*d*. For example, the flash gas discharged from valve 140*b*, the refrigerant vapor discharged from evaporator 160*b*, and the refrigerant vapor discharged from compressor 110*a* may be 430 PSI. At this juncture, the refrigerant of the same pressure mixes together and continues to flow to compressor 110*b* for compression.

Modifications, additions, or omissions may be made to the systems, apparatuses, and methods described herein without departing from the scope of the disclosure. The components of the systems and apparatuses may be integrated or separated. Moreover, the operations of the systems and apparatuses may be performed by more, fewer, or other components. For example, refrigeration system 100 may include any suitable number of compressors, condensers, condenser fans, evaporators, valves, sensors, controllers, and so on, as performance demands dictate. One skilled in the art will also understand that refrigeration system 100 can include other components that are not illustrated but are typically included with refrigeration systems. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A refrigeration system operable to circulate refrigerant through the refrigeration system in order to cool a refrigeration load, the refrigeration system comprising:
a compressor operable to receive the refrigerant from the refrigeration load and compress the refrigerant;
an absorption subcooler comprising a first heat exchanger, a second heat exchanger, a condenser, and an absorption chamber, wherein the first heat exchanger is operable to:
receive the compressed refrigerant from the compressor;
apply a first cooling stage to the compressed refrigerant;
receive a solution comprising a first liquid and an absorption subcooler refrigerant;
discharge the first liquid from the solution to the absorption chamber; and
discharge the absorption subcooler refrigerant from the solution to the condenser; and
a third heat exchanger external from the absorption subcooler, the third heat exchanger operable to receive the refrigerant that has been cooled by the first heat exchanger and apply a second cooling stage to the refrigerant;
wherein the second heat exchanger of the absorption subcooler is operable to receive the cooled refrigerant from the third heat exchanger, apply a third cooling stage to the refrigerant, and discharge the refrigerant to an expansion valve operable to supply the refrigerant to the refrigeration load.

2. The refrigeration system of claim 1, wherein the absorption subcooler is powered by heat absorbed by the first heat exchanger.

3. The refrigeration system of claim 1, wherein the third heat exchanger is a gas cooler and the refrigerant is a natural refrigerant.

4. The refrigeration system of claim 1, wherein the third heat exchanger is a condenser and the refrigerant is a synthetic refrigerant.

5. The refrigeration system of claim 1, wherein the absorption subcooler refrigerant is one of:
ammonia; and
lithium bromide.

6. The refrigeration system of claim 1, wherein:
the condenser is operable to receive the absorption subcooler refrigerant in a gaseous state and condense the absorption subcooler refrigerant into a liquid state; and
the absorption chamber is operable to receive the absorption subcooler refrigerant and mix the absorption subcooler refrigerant with the first liquid.

7. The refrigeration system of claim 1, wherein cooling the refrigerant with the absorption subcooler corresponds to one or more of:
a reduction in power consumed by the refrigeration system relative to the power consumed by a refrigeration system without the absorption subcooler; and
a reduction in a mass flow rate of flash gas discharged from a flash tank of the refrigeration system relative to a mass flow rate of flash gas discharged from the flash tank in the refrigeration system without the absorption subcooler.

8. The refrigeration system of claim 1, wherein the first cooling stage is configured to cool the refrigerant by at least 15° C., the second cooling stage is configured to cool the refrigerant by at least 50° C., and the third cooling stage is configured to cool the refrigerant by at least 2° C.

9. An absorption subcooler comprising a first heat exchanger, an absorption chamber, and a condenser, the first heat exchanger operable to:
receive refrigerant from a compressor of a refrigeration system;
apply a first cooling stage to the refrigerant;

discharge the refrigerant to a gas cooler operable to apply a second cooling stage to the refrigerant;

receive a solution comprising a first liquid and an absorption subcooler refrigerant;

discharge the first liquid from the solution to the absorption chamber; and discharge the absorption subcooler refrigerant from the solution to the condenser.

10. The absorption subcooler of claim 9, wherein the absorption subcooler is powered by heat absorbed by the first heat exchanger.

11. The absorption subcooler of claim 9, wherein the refrigerant is one of:
carbon dioxide;
ammonia; and
hydrofluorocarbons.

12. The absorption subcooler of claim 9, wherein the absorption subcooler refrigerant is one of:
ammonia; and
lithium bromide.

13. The absorption subcooler of claim 9, wherein:
the condenser is operable to receive the absorption subcooler refrigerant in a gaseous state and condense the absorption subcooler refrigerant into a liquid state; and
absorption chamber is operable to receive the absorption subcooler refrigerant and mix the absorption subcooler refrigerant with the first liquid.

14. The absorption subcooler of claim 9, further comprising a second heat exchanger operable to:
receive the refrigerant from the gas cooler;
apply a third cooling stage to the refrigerant; and
discharge the refrigerant to an expansion valve operable to supply the refrigerant to a refrigeration load.

15. The absorption subcooler of claim 9, wherein the first cooling stage is configured to cool the refrigerant by at least 15 degrees, the second cooling stage is configured to cool the refrigerant by at least 50 degrees.

16. A method in an absorption subcooler comprising:
receiving refrigerant from a compressor of a refrigeration system;
applying a first cooling stage to the refrigerant;
discharging the refrigerant to a gas cooler operable to apply a second cooling stage to the refrigerant;
receiving a solution comprising a first liquid and an absorption subcooler refrigerant;
discharging the first liquid from the solution to the absorption chamber; and
discharging the absorption subcooler refrigerant from the solution to the condenser.

17. The method of claim 16, wherein the refrigerant is one of:
carbon dioxide;
ammonia; and
hydrofluorocarbons.

18. The method of claim 16, wherein the absorption subcooler refrigerant comprising is one of:
ammonia; and
lithium bromide.

19. The method of claim 18, further comprising:
condensing the absorption subcooler refrigerant from a gaseous state into a liquid state using a condenser; and
mixing the absorption subcooler refrigerant with the first liquid.

20. The method of claim 16, further comprising:
receiving the refrigerant from the gas cooler;
applying a third cooling stage to the refrigerant; and
discharging the refrigerant to an expansion valve operable to supply the refrigerant to a refrigeration load.

* * * * *

UNITED STATES PATENT AND TRADEMARK OFFICE
CERTIFICATE OF CORRECTION

PATENT NO. : 10,458,685 B2
APPLICATION NO. : 15/346329
DATED : October 29, 2019
INVENTOR(S) : Carlton Wilkerson et al.

It is certified that error appears in the above-identified patent and that said Letters Patent is hereby corrected as shown below:

In the Claims

In Column 18, Line 21, after, "...subcooler refrigerant..." please delete "comprising", therefor.

Signed and Sealed this
Twentieth Day of September, 2022

Katherine Kelly Vidal
*Director of the United States Patent and Trademark Office*